(12) United States Patent
Morroney

(10) Patent No.: US 7,959,173 B1
(45) Date of Patent: Jun. 14, 2011

(54) AIR DISTRIBUTION APPARATUS

(75) Inventor: Wayne D. Morroney, Fremont, OH (US)

(73) Assignee: Alkon Corporation, Fremont, OH (US)

( * ) Notice: Subject to any disclaimer, the term of this patent is extended or adjusted under 35 U.S.C. 154(b) by 274 days.

(21) Appl. No.: 12/238,972

(22) Filed: Sep. 26, 2008

Related U.S. Application Data

(60) Provisional application No. 60/995,308, filed on Sep. 26, 2007.

(51) Int. Cl.
*B60G 11/27* (2006.01)
(52) U.S. Cl. .................................. 280/124.157
(58) Field of Classification Search ............... 137/625.2, 137/625.65, 625.66, 625.69; 280/6.157, 280/86.5, 124.157, 124.16
See application file for complete search history.

(56) References Cited

U.S. PATENT DOCUMENTS

| | | | |
|---|---|---|---|
| 4,187,884 A * | 2/1980 | Loveless | 137/625.69 |
| 5,871,217 A * | 2/1999 | Blanz | 280/6.159 |
| 6,371,227 B2 | 4/2002 | Bartlett | |
| 6,572,124 B2 | 6/2003 | Mlsna et al. | |
| 6,810,982 B2 | 11/2004 | Kuhn et al. | |
| 6,845,989 B2 | 1/2005 | Fulton et al. | |
| 7,331,592 B2 | 2/2008 | Heer | |
| 2003/0111810 A1 * | 6/2003 | Fulton et al. | 280/86.5 |
| 2003/0132594 A1 | 7/2003 | Den Hartog | |
| 2003/0151222 A1 * | 8/2003 | Sutton et al. | 280/86.5 |
| 2005/0224119 A1 * | 10/2005 | Okamoto | 137/625.69 |
| 2006/0267296 A1 | 11/2006 | Dodd et al. | |
| 2007/0277886 A1 | 12/2007 | Morris | |

* cited by examiner

*Primary Examiner* — Paul N Dickson
*Assistant Examiner* — Robert A Coker
(74) *Attorney, Agent, or Firm* — Young Basile Hanlon & MacFarlane, P.C.

(57) ABSTRACT

An air distribution apparatus for directing at least two different air pressure supply sources to fill and exhaust at least a first volume of air and a second volume of air. The apparatus includes a housing and a valve assembly that is disposed within the housing. The valve assembly is movable between a first position, wherein a non-regulated air input port is in communication with a first volume of air to inflate the first volume of air while an exhaust port is in communication with a second volume of air to exhaust the second volume of air, and a second position, wherein a regulated air input port is in communication with the second volume of air to inflate the second volume of air while the first volume of air is in communication with the second volume of air to exhaust air from the first volume of air to the second volume of air.

20 Claims, 12 Drawing Sheets

AIR DISTRIBUTION APPARATUS

CROSS-REFERENCE TO RELATED APPLICATIONS

This application claims the benefit of U.S. Provisional Application No. 60/995,308 filed Sep. 26, 2007.

FIELD OF THE INVENTION

The present invention relates to the field of air distribution modules, and in particular, an apparatus and method for directing air from at least two different air pressure sources to fill and exhaust at least two volumes of air.

BACKGROUND OF THE INVENTION

Many commercial vehicles currently utilize suspension assemblies that can retract and thereby raise the axle of the axle/suspension system off the ground. Such suspension assemblies conventionally are known in the industry as lift axle suspensions. Lift axle/suspension systems usually are paired or grouped with non-lift axle/suspension systems on a vehicle, the latter of which are commonly referred to as primary axle/suspension systems. A majority of lift axle/suspension systems utilize one or more pneumatic air springs to raise or retract the axle/suspension system. Pneumatic air springs of that type typically are referred to as lift air springs and generally can be placed in a variety of locations relative to the axle/suspension system to accomplish the lifting function. Another set, usually a pair, of pneumatic air springs is utilized to lower or extend the axle/suspension system for assisting in supporting the vehicle load and are typically referred to as ride air springs.

Lift axle/suspension systems usually are retracted or raised when the vehicle load is less than the load capacity of the primary or non-lift axle/suspension systems or when greater vehicle maneuverability is required. A number of different types of pneumatic or electro-pneumatic systems can be employed to operate lift axle/suspension systems, depending on the application and customer requirements. The present invention can be utilized with most types of such operating systems and also generally can be used regardless of the location of the one or more lift air springs. Such systems operate by simultaneously, but independently, supplying pressurized or compressed air to the lift air springs and exhausting air pressure from the ride air springs when it is desired to retract or raise the axle/suspension system. Conversely, when it is desired to lower the axle/suspension system to support a load, air pressure is supplied to the ride air springs and simultaneously exhausted from the lift air springs.

Although such prior art operating systems accomplish their goal of raising and lowering the axle/suspension system, a number of drawbacks are inherent in those systems. More particularly, such prior art operating systems often suffer from low overall system air pressure and lack the ability to rapidly deliver pressurized air to the relatively large ride air springs. For example, every time the axle/suspension system is raised or lowered, air pressure from a set of air springs, either the ride air springs or the lift air springs, respectively, is exhausted to the atmosphere. This exhaustion or complete loss of a certain amount of compressed air significantly adds to the total air consumption of the vehicle and increases the demands on the vehicle compressor, which supplies such pressurized air. If the lift axle/suspension system, together with other air-consuming vehicle devices, such as the brakes, are operated repeatedly over a short period of time, demand for pressurized air can exceed the compressor capacity, making it unlikely or impossible for all of the devices to operate at full capacity. More importantly, insufficient air pressure in those devices can cause premature failure of axle/suspension system components, such as axles, beams, and even vehicle frame components, the primary cause of which is low air pressure in the axle/suspension system ride air springs.

Previous designs have reduced or eliminated the above-noted problems by integrating control of the lift and ride air springs rather than allowing them to operate completely independent of one another. However, such systems generally require two different air pressure sources to fill and exhaust the lift air springs and the ride air springs. The air pressure sources usually involve a regulated air pressure source and an unregulated air pressure source. Although the axle lifts are common in the industry, the control circuits used to direct such air pressure sources to control such suspensions have varied widely. Such previous pneumatic control circuits have been comprised of off-the-shelf or modified components bolted together and/or piped together to form a pneumatic circuit. This method of creating a pneumatic circuit is generally not cost-effective nor efficient and requires that the componentry be mounted in enclosures to protect the individual components from the environment and to consolidate the circuit.

It would be desirable to provide an integral apparatus or method that allowed for the cost-effective distribution of two different air pressure sources to efficiently fill and exhaust at least two volumes of air. It would also be desirable to create a distribution apparatus in a single integrated module that need not be contained in a separate and additional enclosure.

SUMMARY OF THE INVENTION

The invention provides an air distribution apparatus for directing at least two different air pressure supply sources to fill and exhaust at least a first volume of air and a second volume of air. The apparatus includes a housing having a non-regulated air input port, a regulated air input port, an exhaust port, a first output port in communication with the first volume of air and a second output port in communication with the second volume of air. A valve assembly is disposed within the housing. The valve assembly is movable between a first position and a second position. When the valve assembly is in the first position, a non-regulated air input port is in communication with a first volume of air to inflate the first volume of air while an exhaust port is in communication with a second volume of air to exhaust the second volume of air. When the valve assembly is in the second position, a regulated air input port is in communication with the second volume of air to inflate the second volume of air while the first volume of air is in communication with the second volume of air to exhaust air from the first volume of air to the second volume of air.

A check valve may be disposed between the first output port and the second output port to prevent transmission of air from the second volume of air to the first volume of air while permitting transmission of air from the first volume of air to the second volume of air when the valve assembly is in the second position.

A regulated air supply source may be coupled to the housing. The regulated air supply source includes an output that is connected to the regulated air input port of the housing and an input that is connected to a non-regulated air supply source.

The first volume of air may include one or more lift air springs of a vehicle. The second volume of air may include one or more ride air springs of the vehicle.

A handle may be connected to the valve assembly and extend outward from the housing to allow manual movement of the valve assembly between the first and second positions. Alternatively, a solenoid may be connected to the valve assembly to allow electrically actuated movement of the valve assembly between the first and second positions.

BRIEF DESCRIPTION OF THE DRAWINGS

The description herein makes reference to the accompanying drawings, wherein like-referenced numerals refer to like parts throughout several views and wherein.

DESCRIPTION OF THE PREFERRED EMBODIMENT

Figure 1A:
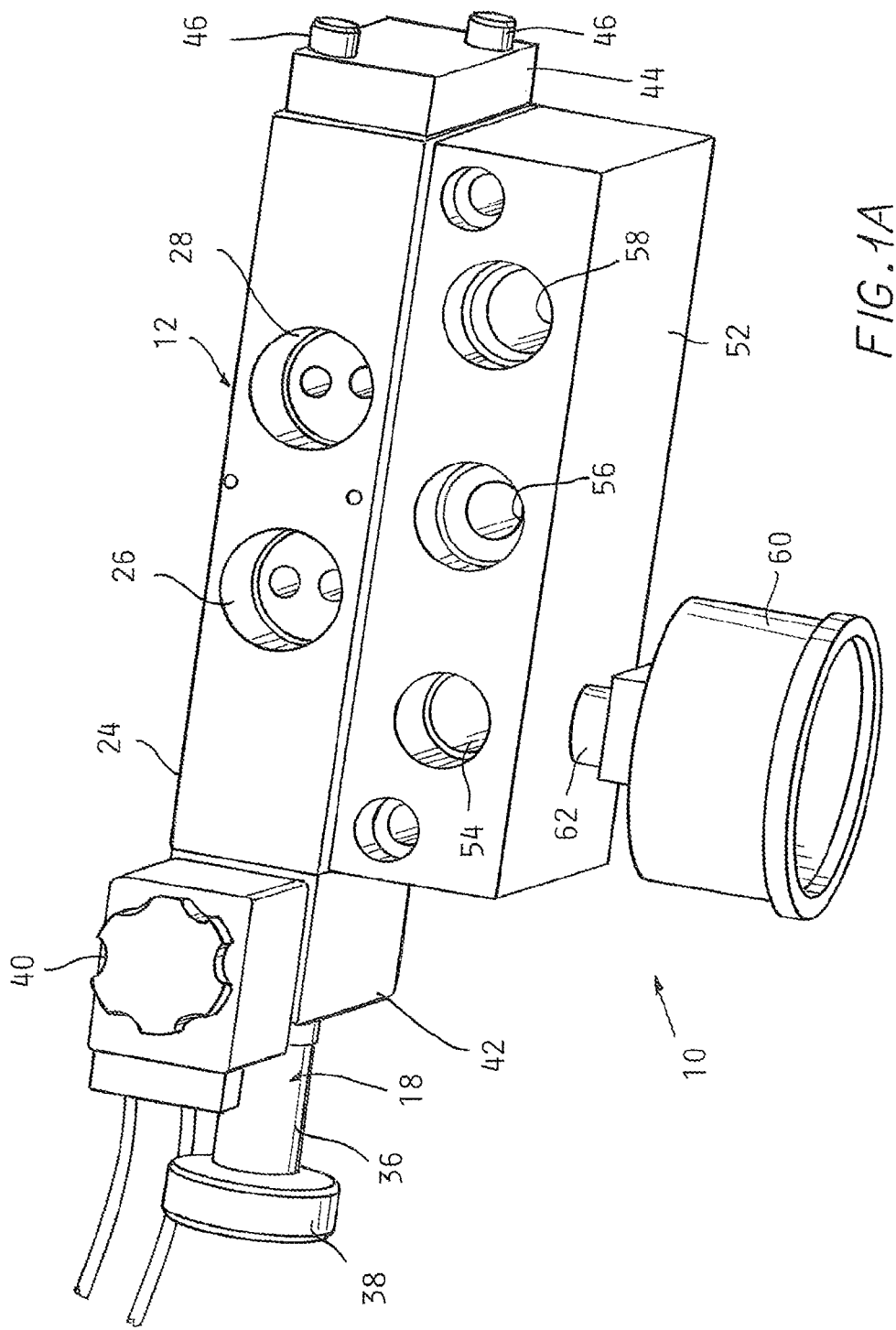
FIG. 1A is a perspective view of the air distribution apparatus of the present invention.

Referring to the drawings, the present invention will now be described in detail with reference to the disclosed embodiments.

As illustrated in FIGS. 1-4C, the present invention provides an air distribution apparatus 10 and method for directing at least two different air pressure supply sources to fill and exhaust at least two volumes of air. The air distribution apparatus 10 provides a housing 12 having a number of individual modules connected to one another. The housing 12 has a central bore 16 for slidably receiving a main spool valve 18 and a plurality of ports and passageways that are in selective communication with the central bore 16. A certain number of the ports communicate with a non-regulated air supply source 17 and a regulated air supply source 19, and other ports in the housing communicate with a first and second volume of air. These volumes of air may correspond to ride air springs 20 and lift air springs 22 of a commercial vehicle trailer (not shown). Although the air distribution apparatus 10 and method of the present invention is ideally suited for the manipulation and distribution of air to the ride air springs 20 and the lift air springs 22 of a commercial vehicle trailer, the present invention is not limited to such an application, but rather, the present invention may be utilized for any air distribution application, wherein two different air pressure sources are utilized to fill and exhaust particular volumes of air. It is anticipated that other applications, such as robotic spot welding applications, may utilize the invention, wherein a non-regulated air pressure source is utilized to open a weld gun, and a regulated air pressure source is used to close the weld gun to provide control of the tip pressure during the welding of the workpiece. Thus, it is anticipated that the air distribution apparatus 10 and method of the present invention may have a variety of practical applications.

Figure 2A:
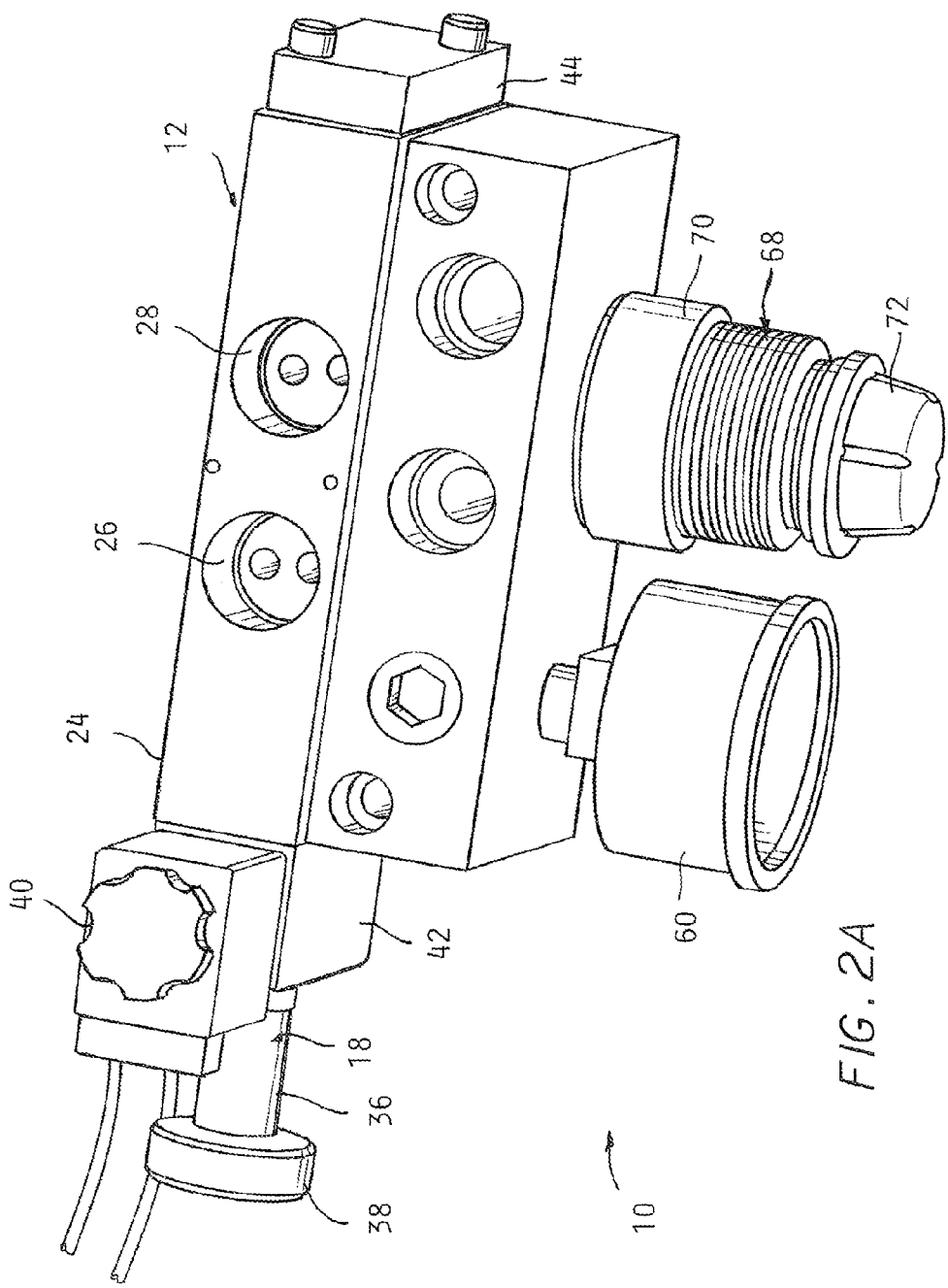
FIG. 2A is a perspective view of the air distribution apparatus of the present invention having an air regulator included therein.
Figure 3A:
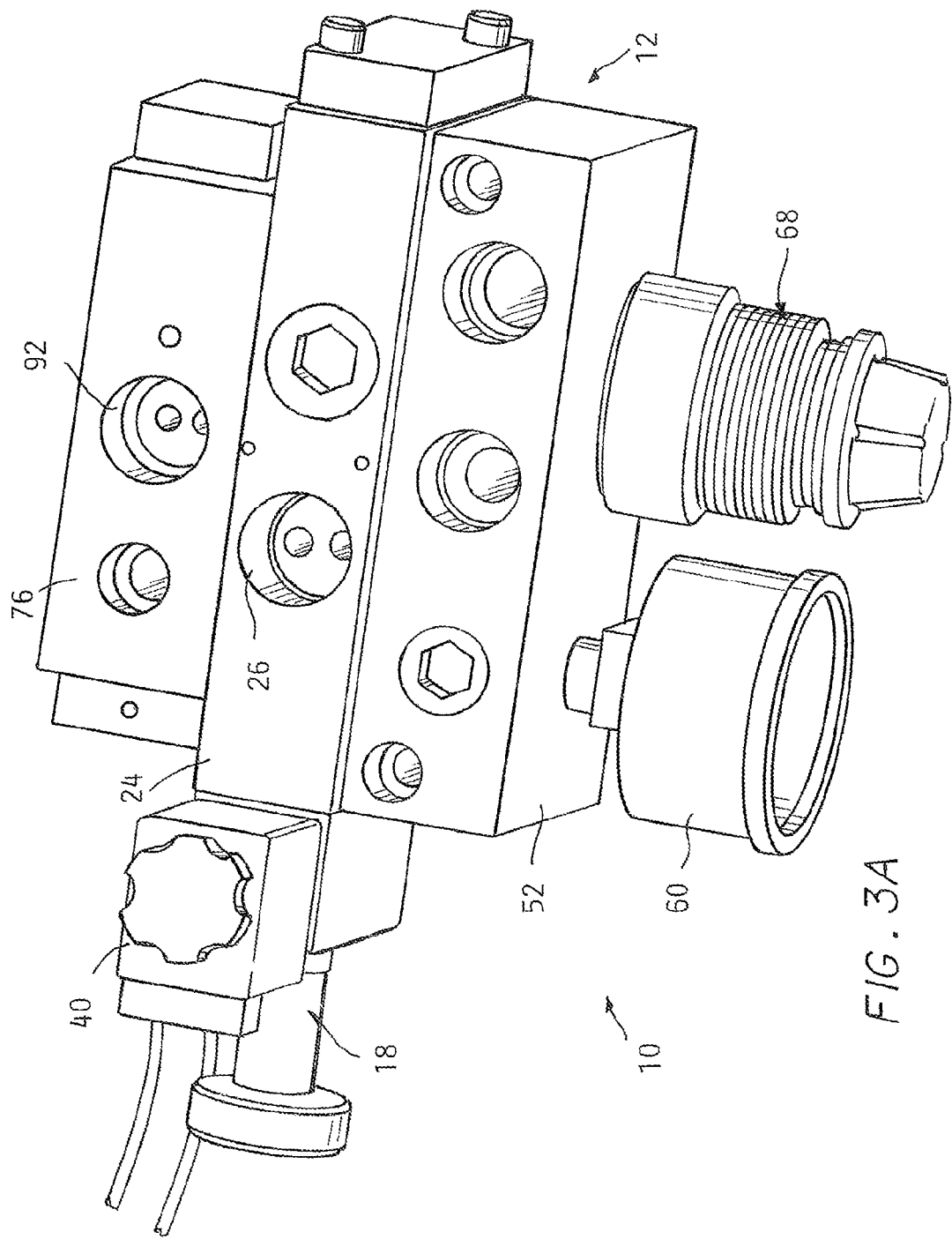
FIG. 3A is a perspective view of the air distribution apparatus of the present invention having an integral bypass circuit and an air regulator included therein.
Figure 4A:
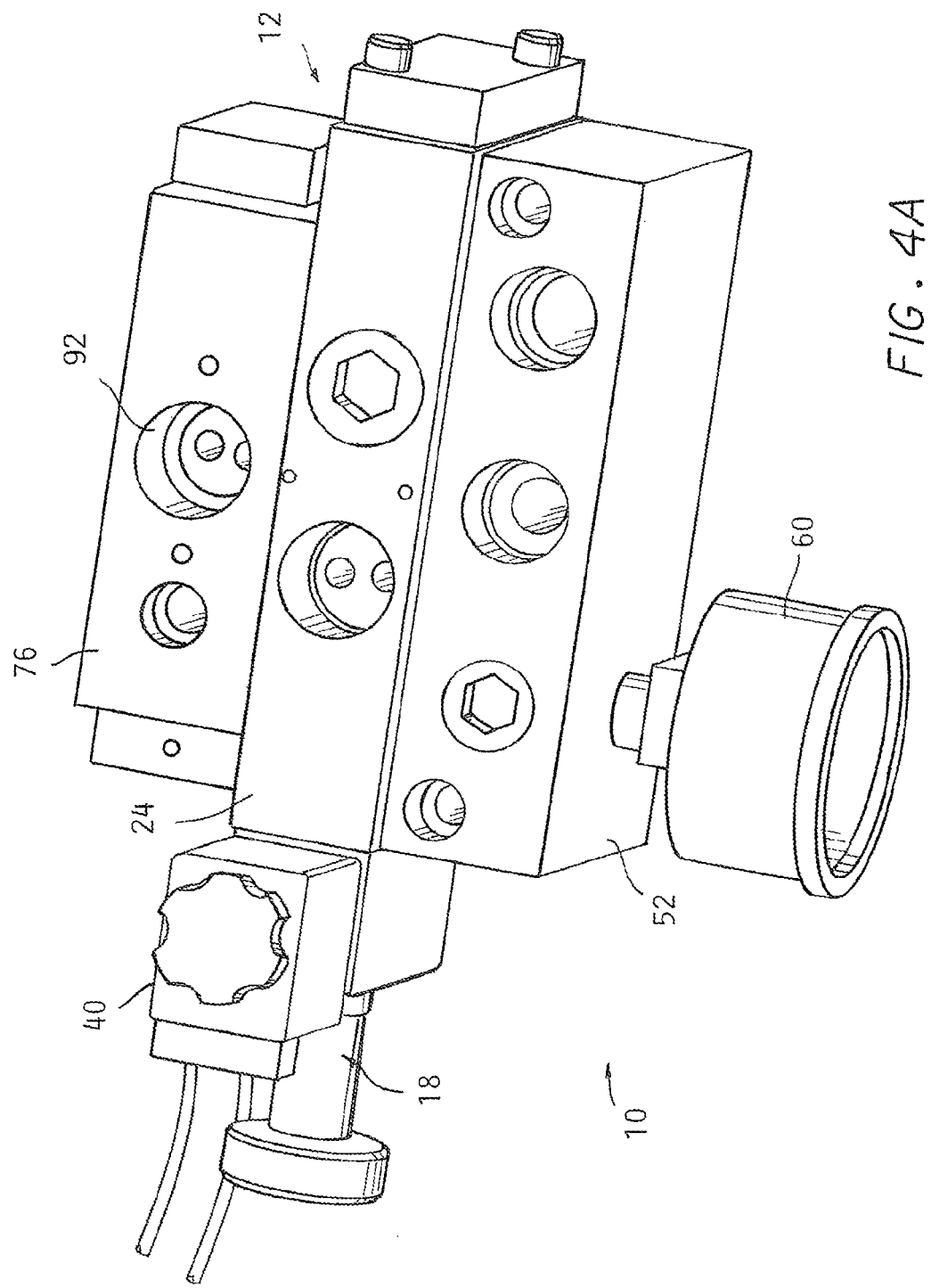
FIG. 4A is a perspective view of the air distribution apparatus of the present invention having an integral bypass circuit included therein.

In order to regulate two different sources of pressurized air to fill and exhaust two particular volumes of air, such as the ride air springs 20 and the lift air springs 22 of the commercial vehicle trailer, the housing 12 of the air distribution apparatus 10 provides a central module 24. The central module 24 has a substantially rectangular block configuration having an internal central bore 16 extending along its longitudinal axis. A plurality of ports extend from the outer walls of the central module 24 to communicate with the central bore 16. Ports 26, 28 communicate with the ride air springs 20 and the lift air springs 22 of the commercial vehicle trailer. The port 26 provides a normally open circuit to the ride air spring 20, and the port 28 provides a normally closed circuit to the lift air springs 22. The central module 24 may be rotated 180° to provide the ride air spring 20 with a normally closed circuit and the lift air spring 22 with a normally open circuit. Other ports may also be provided in the central module 24 and will further be described in the specification. Those ports which are provided and have no use in a particular application may be capped with a plug 29, as seen in FIGS. 2A, 3A, and 4A.

To direct air flow throughout the housing 12, the main spool valve 18 is slidably received within the central bore 16 of the central module 24. The main spool valve 18 has a substantially cylindrical, stepped diameter configuration forming three substantially cylindrical landings 30 within the central bore 16. Each of the three landings 30 provides a sliding fit with regard to the portion of the central module 24 defining the central bore 16, and flexible O-rings 32 are seated within recesses 34 at the ends of the landings 30 so as to provide a seal between the landings 30 and the central module 24. The areas of the main spool valve 18 extending between the landings 30 have a reduced diameter as compared to the diameter of the landings 30 so as to allow air to travel through the central bore 16 to the desired ports and passageways of the housing 12.

Figure 1B:
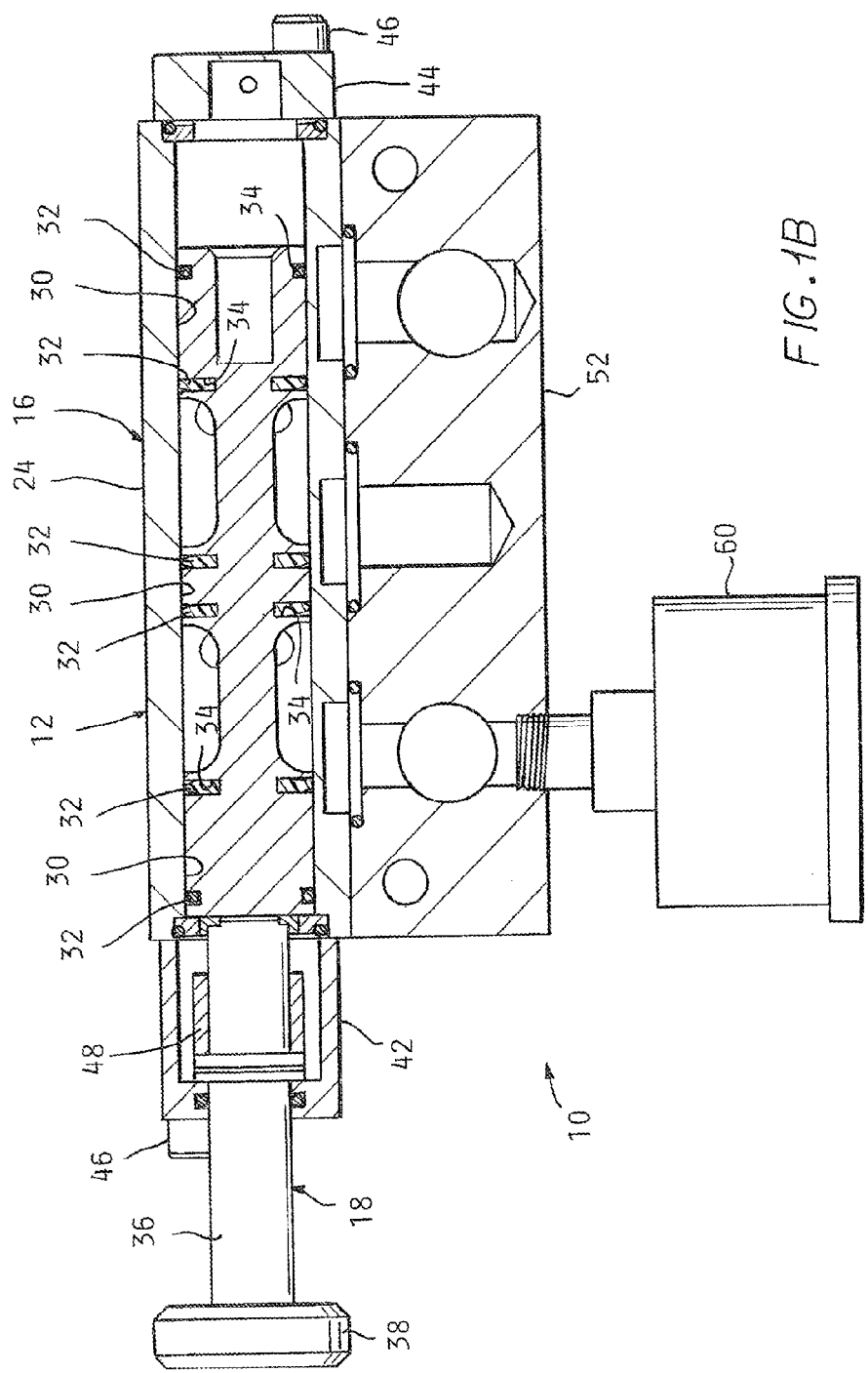
FIG. 1B is a cross-sectional view of the air distribution apparatus of the present invention shown in FIG. 1A.

In order to redirect the flow of air to various ports and passageways, the main spool valve 18 may be actuated between a first position, wherein the main spool valve 18 is positioned to the left side of the central bore 16, as seen in FIG. 1B, and a second position, wherein the main spool valve 18 is positioned to the right side of the central bore 16 (not shown). The main spool valve 18 has a handle 36 integrally connected to an end of one of the landings 30 of the main spool valve 18. The handle 36 extends outwardly from the central module 24 of the housing 12 and has a cylindrical knob 38 on the end of the handle 36. The main spool valve 18 may be manually moved between the first and second position by pushing or pulling the knob 38 of the handle 36 on the main spool valve 18, or the main spool valve 18 may be electronically actuated through the use of a solenoid 40. A small, substantially rectangular extension of the central module 24 includes a first extension portion 42 that is connected to the end of the central module 24 adjacent to the handle 36 and a second extension portion 44 that is connected to the end of the central module 24 opposite the handle 36 through the use of conventional fasteners 46. These conventional fasteners 46 are fabricated from stainless steel to avoid corrosion. The first extension portion 42 of the central module 24 has a compression spring 48 disposed therein for biasing the main spool valve 18 to the first position. When electronically actuated, the solenoid 40 opens a port to allow pressurized air within the first extension portion 42 of the central module 24 and behind a landing of the main spool valve 18 to force the main spool valve 18 toward the second position. When the solenoid 40 is de-actuated, the force of the compression spring 48 biases the main spool valve 18 back toward the first position. The second extension portion 44 on the opposite side of the central module 24 of the housing 12 provides a port 50 to allow for air to exhaust and fill the central bore 16 so as not to create vacuum within the central bore 16. The port 50 may be directed to exhaust to prohibit any outside contamination from entering the central bore 16.

In order to communicate the air supply sources with the ride air springs 20 and the lift air springs 22 of the commercial vehicle trailer, a lower module 52 is fastened to the central module 24 of the housing 12. The lower module 52 is connected through the use of conventional fasteners 46 fabricated from stainless steel to avoid corrosion. The lower module 52 has a substantially rectangular configuration with ports extending through the exterior sides of the lower module 52 to the interior portions of the lower module 52. The abutting surfaces of the lower module 52 and the central module 24 have ports that communicate with one another. The lower module 52 has a port 54 for receiving the regulated air supply 19 from a height control valve (HCV, not shown). The height control valve monitors the height of the commercial vehicle trailer through the application of the regulated air supply 19. Another port 56 is connected to exhaust for exhausting unwanted air, and a separate port 58 is connected to the non-regulated supply 17 of air pressure. A gauge 60 is connected to a port 62 on a side of the lower module 52 for measuring the air pressure being provided by the regulated air pressure supply 19 through the height control valve.

Figure 1C:
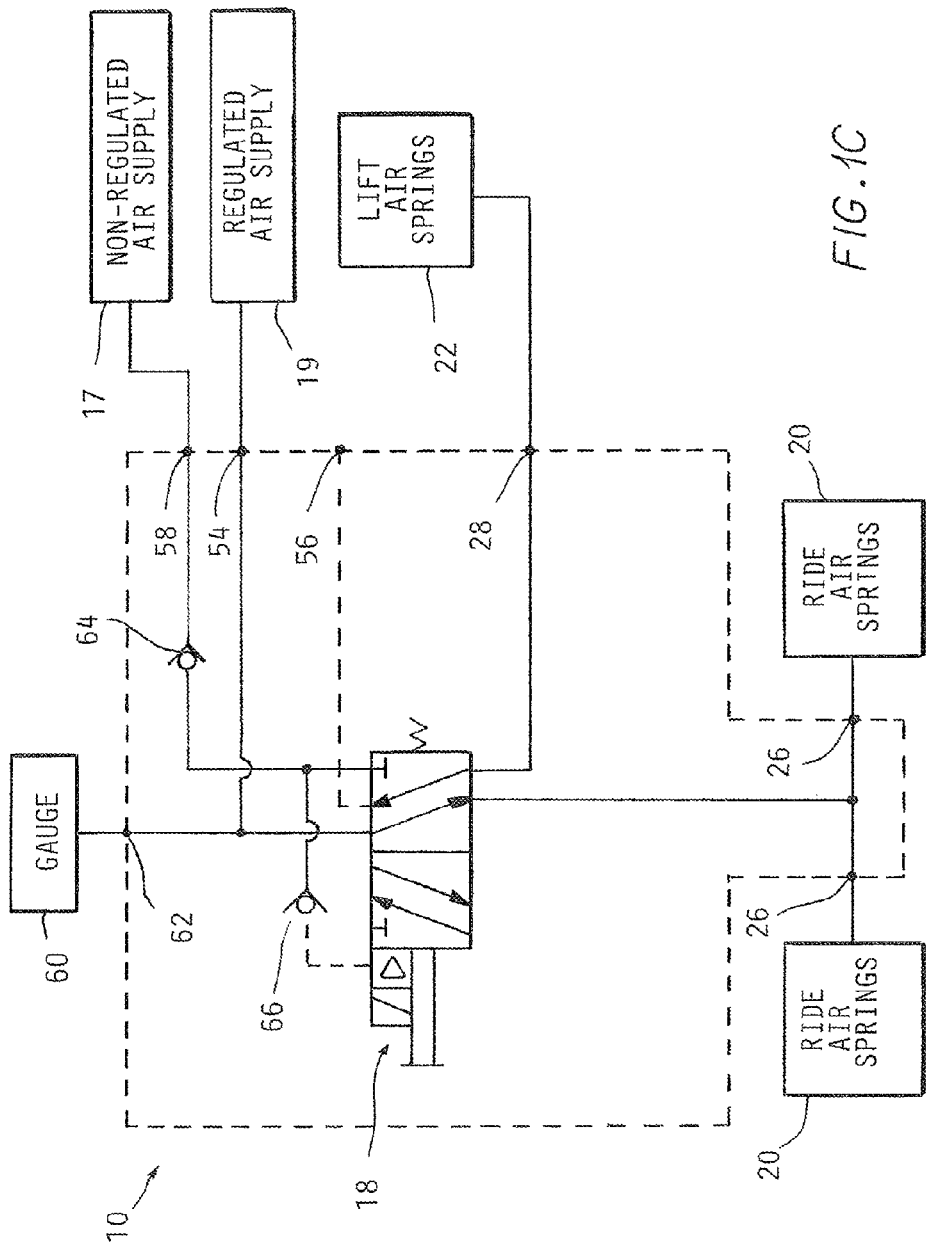
FIG. 1C is a pneumatic circuit diagram showing the air distribution apparatus of the present invention shown in FIG. 1A.

In operation, the embodiment shown in FIGS. 1A-1B functions in accordance with the pneumatic circuit diagram of FIG. 1C. Thus, when the main spool valve 18 is in the first position, as shown in FIGS. 1A-1B, the supply of regulated air pressure 19 is provided through the height control valve and directed to the ride air springs 20, and the supply of non-regulated air 17 is prevented from reaching the lift air springs 22, thereby maintaining the lift air springs 22 in a deflated position. When the non-regulated air 17 is supplied to the circuit, the supply of non-regulated air 17 opens a supply check valve 64 and then opens a solenoid pilot check valve 66 so as to electronically engage the solenoid 40. The main spool valve 18 then shifts to the second position so that the regulated air 19 from the height control valve is shut off from the ride air springs 20, and the air from the non-regulated supply 17 of air is supplied to the lift air springs 22. Thus, the air from the ride air springs 20 is allowed to exhaust, as air is being supplied to the lift air springs 22. When the supply of non-regulated air 19 is shut off, the solenoid 40 disengages, and the main spool valve 18 returns to the first position, wherein the supply of regulated air 19 returns to inflate the ride air springs 20 while the air in the lift air springs 22 is allowed to exhaust.

Figure 2B:
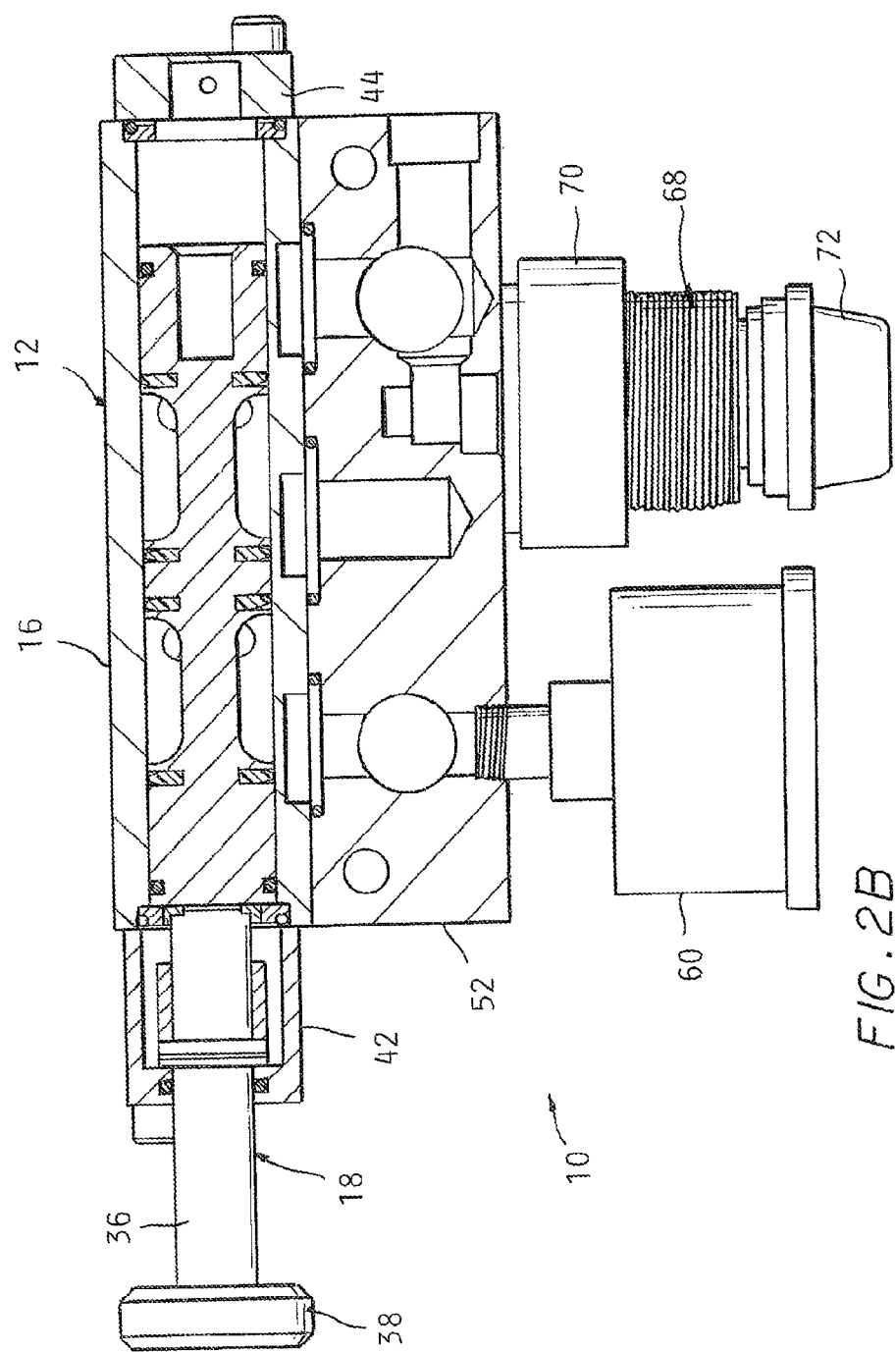
FIG. 2B is a cross-sectional view of the air distribution apparatus of the present invention shown in FIG. 2A.

To regulate the supply of non-regulated air pressure 17, a regulator 68 may be attached to the air distribution apparatus 10 to manually regulate the non-regulated air supply 17. As shown in FIGS. 2A-2B, the regulator 68 is connected to a port 70 in a side of the lower module 52 of the housing 12. The regulator 68 is in communication with the supply of non-regulated air 17 through the lower module 52 so as to provide the ride air springs 20 with a regulated air supply 19, similar to the regulated air supply 19 of the height control valve, as shown in FIGS. 1A-1B. However, the regulator 68 allows for manual adjustment of the air pressure by turning a knob 72 on the regulator 68. The supply of non-regulated air 17 is still directed to the lift air springs 22 when the solenoid 40 actuates the main spool valve 18 to the second position.

Figure 2C:
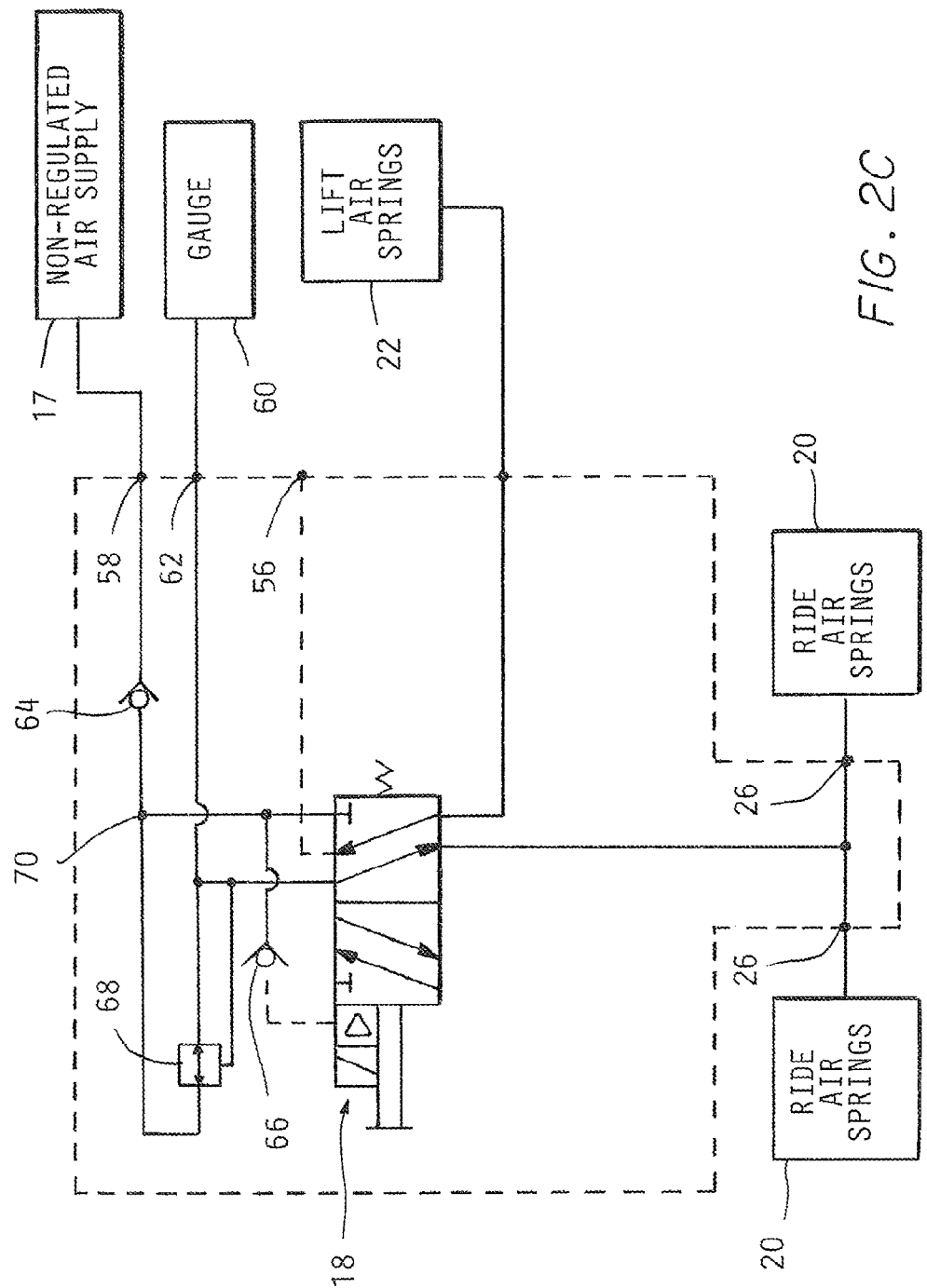
FIG. 2C is a pneumatic circuit diagram showing the air distribution apparatus of the present invention shown in FIG. 2A.

In operation, the embodiment shown in FIGS. 2A-2B functions in accordance with the pneumatic circuit diagram shown in FIG. 2C. As shown in FIG. 5, the regulator 68 regulates the supply of non-regulated air 17 to provide regulated air to the ride air springs 20. The remaining portions of the pneumatic circuit act in similar fashion as described in connection with FIGS. 1A-1C.

Figure 3B:
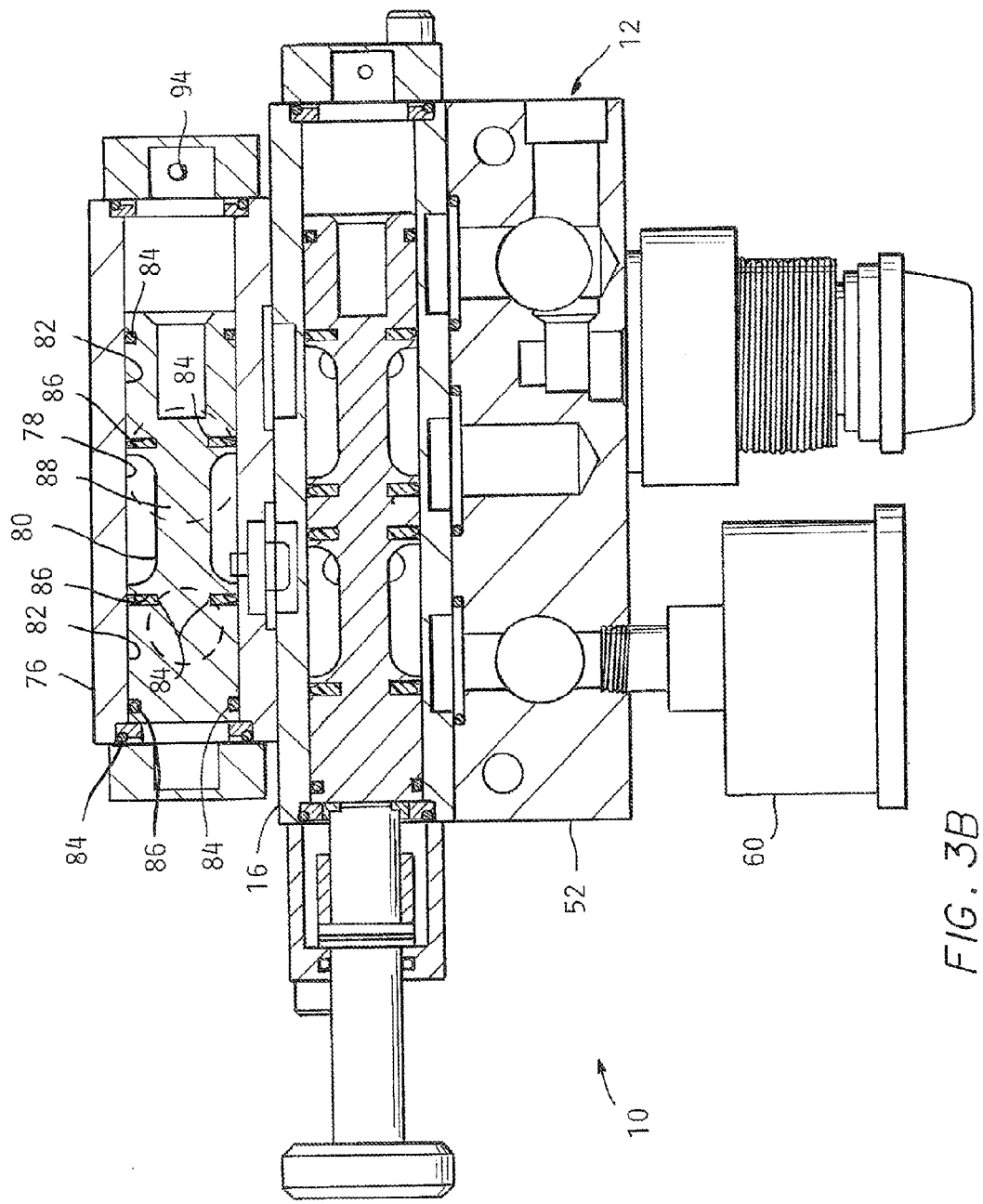
FIG. 3B is a cross-sectional view of the air distribution apparatus of the present invention shown in FIG. 3A.

To enhance efficiency of the system, an integral bypass circuit 74 allows air in the lift air springs 22 to exhaust back into the ride air springs 20 when the supply of non-regulated air 17 is no longer being supplied to the lift air springs 22, as shown in FIGS. 3A-3B. The embodiment shown in FIGS. 3A-3B is similar to that described in connection with FIGS. 2A-2B; however, an upper module 76 is connected to the central module 24 on the opposite side of the lower module 52 of the housing 12. The upper module 76 has a substantially rectangular configuration and is fabricated from anodized aluminum to avoid any corrosion of the upper module 76. The upper module 76 is fastened to the central module 24 through the use of the conventional fasteners 46 fabricated from stainless steel so as to also avoid any corrosion. The upper module 76 has an internal bore 78 for housing a secondary spool valve 80 therein. The secondary spool valve 80 may be an air-actuated valve, such that supply of air pressure to the upper module 76 causes movement of the secondary spool valve 80, as will be explained herein. The secondary spool valve 80 has a stepped diameter, thereby forming a pair of landings 82, which maintain a sliding fit with the portion of the upper module 76 defining the internal diameter of the bore 78. Flexible annular seals 84 are housed within recesses 86 formed at each end of each landing 82 so as to maintain a seal between the upper module 76 and the landings 82 of the second spool valve 80. A reduced diameter 88 of the secondary spool valve 80 is provided between the landings 82 to allow for transmission of air through the upper module 76. Ports are provided between adjacent sides of the upper module 76 and the central module 24 to communicate air therethrough.

Figure 3C:
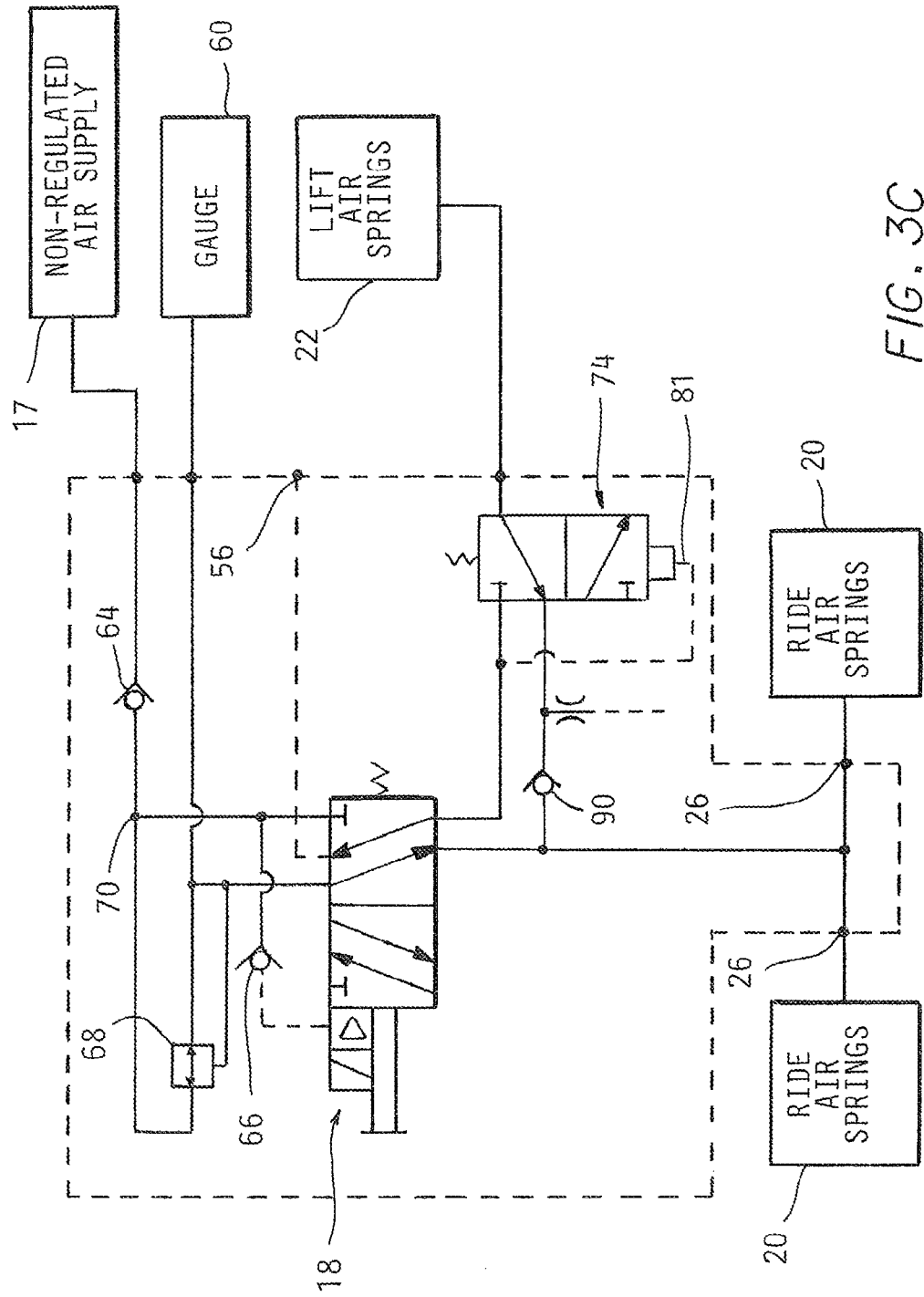
FIG. 3C is a pneumatic circuit diagram showing the air distribution apparatus of the present invention shown in FIG. 3A.

In use, the operation of the embodiment shown in FIGS. 3A-3B functions in accordance with the pneumatic circuit diagram shown in FIG. 3C. Thus, when the main spool valve 18 is in the first position, regulated air 19 is directed to the ride air springs 20, and a supply check valve 90 prevents regulated air 19 from passing to the lift air springs 22 through the integral bypass circuit 74. When the supply of unregulated air pressure 17 is provided, the main spool valve 18 shifts to the second position, and unregulated air 17 is supplied to the upper module 76. Furthermore, when air is supplied to the upper module 76, an actuator passage 81 is pressurized, thereby shifting the secondary spool valve 80 of the integral bypass circuit 74 to the right. This allows unregulated air 17 to be directed to the lift air springs 22 through a port 92 provided in the upper module 76 of the housing 12. When the supply of unregulated air 17 is shut off, the secondary spool valve 80 of the integrated bypass circuit 74 shifts back to the left, and air is allowed to exhaust through the supply check valve 90 and back to the ride air springs 20. The exhaust from the lift air spring 22 assists the supply of regulated air 19 to quickly and efficiently refill the ride air springs 20. A restricted exhaust port 94 is also provided to allow air from the lift air springs 22 to exhaust if the appropriate pressure has already been provided to the ride air springs 20.

Figure 4B:
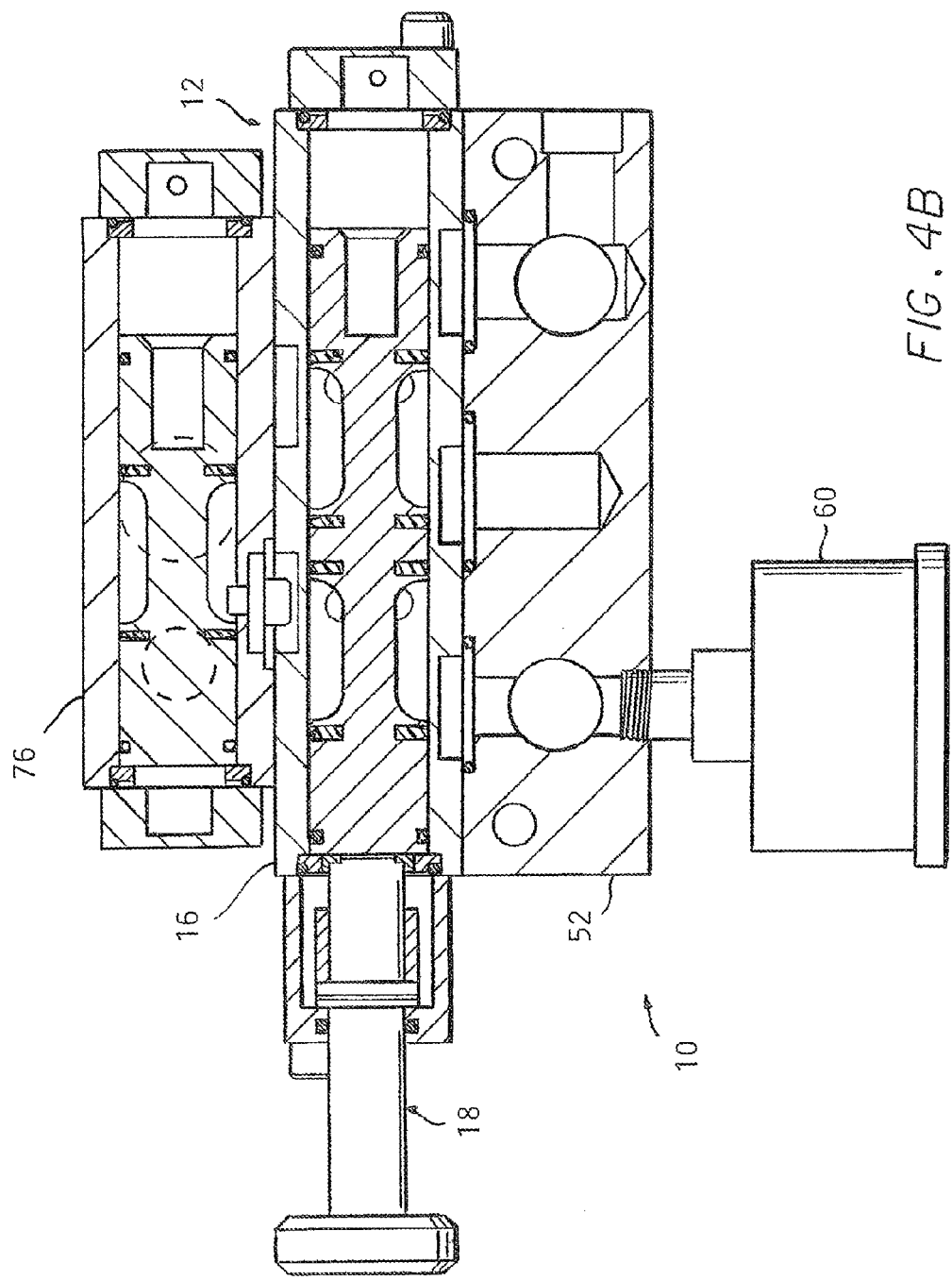
FIG. 4B is a cross-sectional view of the air distribution apparatus of the present invention shown in FIG. 4A.
Figure 4C:
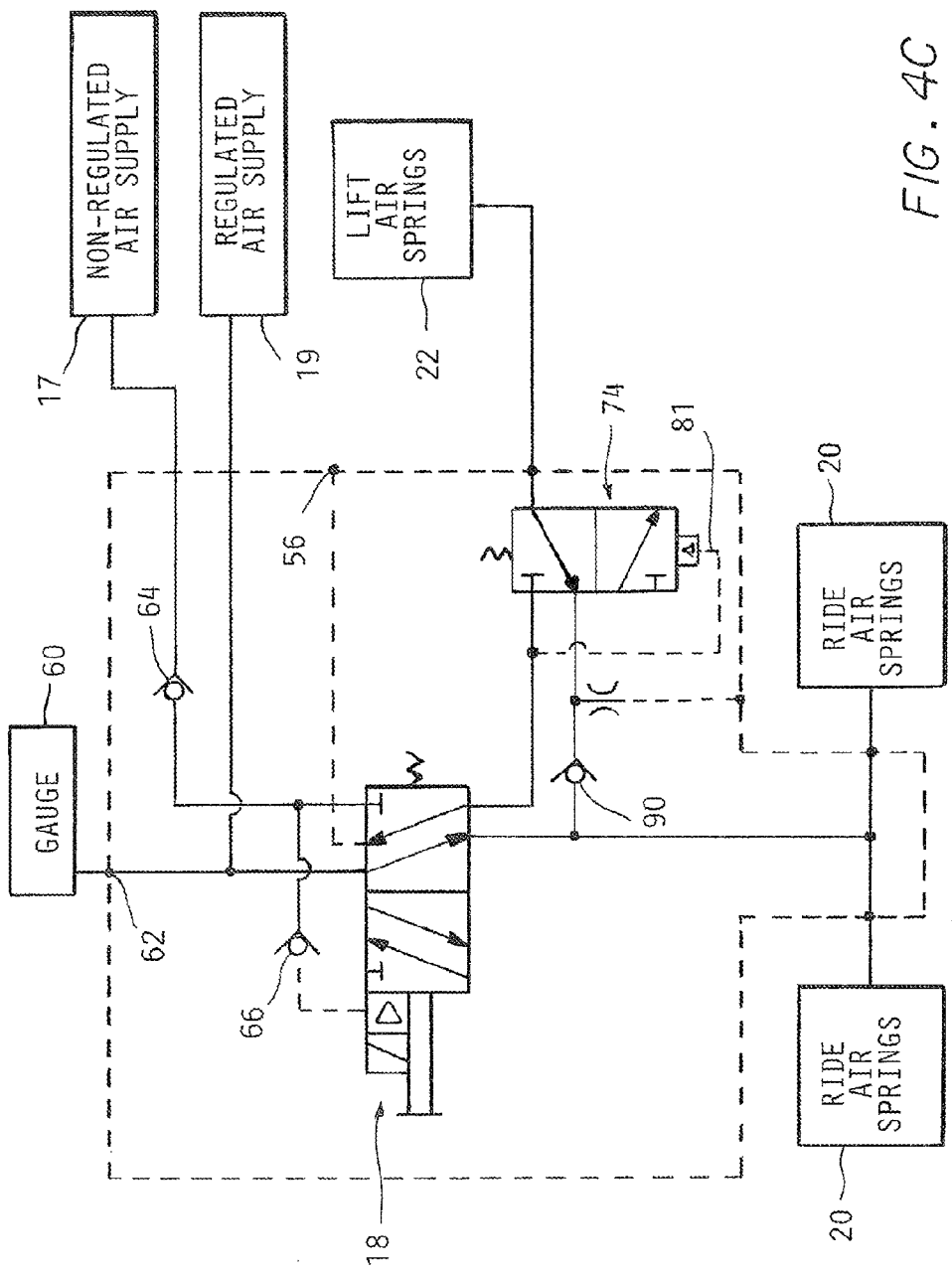
FIG. 4C is a pneumatic circuit diagram showing the air distribution apparatus of the present invention shown in FIG. 4A.

In order to utilize an air distribution apparatus 10 having the integral bypass circuit 74 without the air regulator 68, the apparatus 10 may utilize a height control valve to provide a regulated supply 19 of air, as shown in FIGS. 4A-4B. Thus, the embodiment shown in FIGS. 4A-4B operates in the same manner as described in the pneumatic circuit diagram shown in FIG. 4C and as previously described in the other embodiments.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An air distribution apparatus for directing at least two different air pressure supply sources to fill and exhaust at least a first volume of air and a second volume of air, comprising:
    a housing having a non-regulated air input port, a regulated air input port, an exhaust port, a first output port in communication with the first volume of air and a second output port in communication with the second volume of air; and
    a valve assembly disposed within the housing, the valve assembly movable between a first position, wherein the non-regulated air input port is in communication with the first volume of air to inflate the first volume of air while the exhaust port is in communication with the second volume of air to exhaust the second volume of air, and a second position, wherein the regulated air input port is in communication with the second volume of air to inflate the second volume of air while the first volume of air is in communication with the second volume of air to exhaust air from the first volume of air to the second volume of air.

2. The air distribution apparatus of claim 1, further comprising:
    a check valve disposed between the first output port and the second output port to prevent transmission of air from the second volume of air to the first volume of air while permitting transmission of air from the first volume of air to the second volume of air when the valve assembly is in the second position.

3. The air distribution apparatus of claim 1, wherein a regulated air supply source is coupled to the housing and includes an output that is connected to the regulated air input port of the housing and an input that is connected to a non-regulated air supply source.

4. The air distribution apparatus of claim 1, wherein the first volume of air includes one or more lift air springs of a vehicle and the second volume of air includes one or more ride air springs of the vehicle.

5. The air distribution apparatus of claim 1, further comprising:
    a handle that is connected to the valve assembly and extends outward from the housing to allow manual movement of the valve assembly between the first and second positions.

6. The air distribution apparatus of claim 1, further comprising:
    a solenoid that is connected to the valve assembly to allow electrically actuated movement of the valve assembly between the first and second positions.

7. The air distribution apparatus of claim 1, further comprising:
    a solenoid that is connected to the valve assembly to allow electrically actuated movement of the valve assembly between the first and second positions.

8. An air distribution apparatus for directing at least two different air pressure supply sources to fill and exhaust at least a first volume of air and a second volume of air, comprising:
    a housing having a primary bore, a bypass bore, a non-regulated air input port, a regulated air input port, an exhaust port, a first output port in communication with the first volume of air and a second output port in communication with the second volume of air; and
    a valve assembly disposed within the housing, the valve assembly including a primary valve disposed in the primary bore and a bypass valve disposed in the bypass bore, the valve assembly movable between a first position, wherein the non-regulated air input port is in communication with the first volume of air through the primary valve and the bypass valve to inflate the first volume of air while the exhaust port is in communication with the second volume of air through the primary valve to exhaust the second volume of air, and a second position, wherein the regulated air input port is in communication with the second volume of air through the primary valve to inflate the second volume of air while the first volume of air is in communication with the second volume of air through the bypass valve to exhaust air from the first volume of air to the second volume of air.

9. The air distribution apparatus of claim 8, further comprising:
    an air operated actuator in communication with the primary valve, the actuator operable to move the bypass valve in response to movement of the primary valve to provide synchronous movement of the primary valve and the bypass valve during movement of the valve assembly between the first and second positions.

10. The air distribution apparatus of claim 8, further comprising:
    a check valve disposed between the bypass valve and the second volume of air to prevent transmission of air from the second volume of air to the bypass valve while permitting transmission of air from the first volume of air to the second volume of air through the bypass spool valve when the valve assembly is in the second position.

11. The air distribution apparatus of claim 8, wherein the regulated air supply source is coupled to the housing and includes an output that is connected to the regulated air input port of the housing and an input that is connected to a non-regulated air supply source.

12. The air distribution apparatus of claim 8, wherein the first volume of air includes one or more lift air springs of a vehicle and the second volume of air includes one or more ride air springs of the vehicle.

13. The air distribution apparatus of claim 8, further comprising:
    a handle that is connected to the valve assembly and extends outward from the housing to allow manual movement of the valve assembly between the first and second positions.

14. An air distribution apparatus for directing at least two different air pressure supply sources to fill and exhaust at least a first volume of air and a second volume of air, comprising:
- a housing having a primary bore and a bypass bore;
- a primary spool valve slidably received within said primary bore;
- a bypass spool valve slidably received within said bypass bore;
- a first input port formed in the housing and adapted to receive non-regulated air from a non-regulated air supply source, the first input port in communication with the primary spool valve;
- a second input port formed in the housing and adapted to receive regulated air from a regulated air supply source, the second input port in communication with the primary spool valve;
- an exhaust port formed in the housing and in communication with the primary spool valve;
- a first output port formed in the housing and in communication with the first volume of air and the bypass spool valve;
- a second output port formed in the housing and in communication with the second volume of air, the primary spool valve and the bypass spool valve; and
- said primary spool valve movable between a first position, wherein the first input port is in communication with the first volume of air through the bypass spool valve to inflate the first volume of air with the non-regulated air while the exhaust port is in communication with the second volume of air to exhaust the second volume of air, and a second position, wherein the second input port is in communication with the second volume of air to inflate the second volume of air with the regulated air while the first volume of air is in communication with the second volume of air through the bypass spool valve to exhaust air from the first volume of air to the second volume of air.

15. The air distribution apparatus of claim 14, further comprising:
- an air operated actuator in communication with the primary spool valve, wherein the primary spool valve provides non-regulated air to the actuator when the primary spool valve is in the first position, the actuator operable to move the bypass spool valve from a first position to a second position, wherein the bypass spool valve is in the first position when the primary spool valve is in the first position and the bypass spool valve is in the second position when the primary spool valve is in the second position.

16. The air distribution apparatus of claim 14, further comprising:
- a check valve disposed between the bypass spool valve and the second volume of air to prevent transmission of air from the second volume of air to the bypass spool valve while permitting transmission of air from the first volume of air to the second volume of air through the bypass spool valve when the primary spool valve is in the second position.

17. The air distribution apparatus of claim 14, wherein the regulated air supply source is coupled to the housing and includes an output that is connected to the second input port of the housing and an input that is connected to the non-regulated air supply source.

18. The air distribution apparatus of claim 14, wherein the first volume of air includes one or more lift air springs of a vehicle and the second volume of air includes one or more ride air springs of the vehicle.

19. The air distribution apparatus of claim 14, further comprising:
- a handle that is connected to the primary spool valve and extends outward from the housing to allow manual movement of the primary spool valve between the first and second positions.

20. The air distribution apparatus of claim 14, further comprising:
- a solenoid that is connected to the primary spool valve to allow electrically actuated movement of the primary spool valve between the first and second positions.

* * * * *